(12) United States Patent
Litz et al.

(10) Patent No.: US 8,607,626 B2
(45) Date of Patent: Dec. 17, 2013

(54) RESTRAINT SYSTEM FOR RESTRAINING A TEST ARTICLE IN A SELECTED VERTICAL POSITION RELATIVE TO A MOVABLE BELT

(75) Inventors: Bradley C. Litz, Chaska, MN (US); Thomas R. Kerns, Eden Prairie, MN (US); Jay S. Warner, Annandale, MN (US); Armin-Otto Michelbach, Lauda-Koenigshofen (DE)

(73) Assignee: MTS Systems Corporation, Eden Prairie, MN (US)

( * ) Notice: Subject to any disclaimer, the term of this patent is extended or adjusted under 35 U.S.C. 154(b) by 47 days.

(21) Appl. No.: 12/396,900

(22) Filed: Mar. 3, 2009

(65) Prior Publication Data

US 2009/0217775 A1 Sep. 3, 2009

Related U.S. Application Data

(60) Provisional application No. 61/033,172, filed on Mar. 3, 2008.

(51) Int. Cl.
*G01M 17/007* (2006.01)

(52) U.S. Cl.
USPC ..................... 73/116.07; 73/116.08

(58) Field of Classification Search
USPC ............... 73/116.05, 116.06, 116.07, 116.08, 73/116.09, 116.11
See application file for complete search history.

(56) References Cited

U.S. PATENT DOCUMENTS

| | | | |
|---|---|---|---|
| 3,914,990 A | 10/1975 | Borg | |
| 4,238,954 A | 12/1980 | Langer | |
| 4,455,866 A | 6/1984 | Barrigar | |
| 4,798,088 A | 1/1989 | Haeg et al. | |
| 4,862,737 A * | 9/1989 | Langer | 73/116.07 |
| 5,111,685 A * | 5/1992 | Langer | 73/118.01 |
| 6,427,528 B1 * | 8/2002 | Yamakado et al. | 73/121 |
| 2006/0237237 A1 | 10/2006 | Kerschbaum | |
| 2008/0173101 A1 * | 7/2008 | Sowle | 73/862.09 |
| 2009/0133484 A1 * | 5/2009 | Inoue et al. | 73/117.01 |

FOREIGN PATENT DOCUMENTS

| | | |
|---|---|---|
| JP | 04050630 | 2/1992 |
| JP | 08043264 | 2/1996 |
| JP | 09304237 | 11/1997 |
| JP | 2007212154 | 8/2007 |
| SU | 546927 | 3/1977 |

(Continued)

OTHER PUBLICATIONS

Submitted herewith is an Official Search Report of the European Patent Office in counterpart foreign application No. PCT/US2009/001353 filed Mar. 3, 2009.

(Continued)

*Primary Examiner* — Eric S McCall

(74) *Attorney, Agent, or Firm* — Steven M. Koehler; Westman, Champlin & Koehler P.A.

(57) ABSTRACT

A test system includes a platform having a movable endless belt. A restraint is configured to restrain a test article in a selected vertical position relative to the moveable belt. The restraint includes at least a pair of axially rigid supports wherein at least one rigid support is provided on each side of the movable belt and has an end configured to be secured to the test article, and wherein each support extends from a stationary portion, relative to the belt, of the platform over at least a portion of the movable belt.

25 Claims, 16 Drawing Sheets

(56) References Cited

FOREIGN PATENT DOCUMENTS

| SU | 890428 | 12/1981 |
|---|---|---|
| SU | 1211625 | 2/1986 |
| WO | 2005022108 | 3/2005 |

OTHER PUBLICATIONS

Submitted herewith is a Written Opinion of the European Patent Office in counterpart foreign application No. PCT/US2009/001353 filed Mar. 3, 2009.

A Dynamometer on which the Dynamic Behavior of a Passenger Can be Simulated, by Jean Odier, published in Proc. Instn. Mech. Engrs., vol. 186, Jul. 1972, pp. 87-96 & D25.

Road-Holding: Braking and Traction, Paper 700367, New York, Society of Automotive Engineers, Inc., 1970; pp. 204-209; by Jean Odier.

Indoor Vehicle Braking Simulation: Correlation and Comparison with Road Testing, Paper 730,562, New York: Society of Automotive Engineers, Inc., 1973; 7 page booklet by Jean Odier.

The Road Simulation Rig, Valeo Publisher, acknowledged prior art, publication date unknown, cover, 9 pages.

Aerodynamics of Road Vehicles, Edited by Wolf-Heinrich Hucho, Fourth Edition, Table of Contents and Chapter 13 entitled "Wind Tunnels", 1988.

Notice of Reasons for Rejection, mailing date Sep. 19, 2013 for corresponding Japanese Patent Application 2010-549655, filed Mar. 3, 2009.

\* cited by examiner

RESTRAINT SYSTEM FOR RESTRAINING A TEST ARTICLE IN A SELECTED VERTICAL POSITION RELATIVE TO A MOVABLE BELT

CROSS-REFERENCE TO RELATED APPLICATIONS

This application claims the benefit of U.S. Provisional Application entitled "RESTRAINT SYSTEM" having Ser. No. 61/033,172, and filed Mar. 3, 2008, the content of which is incorporated herein in its entirety.

BACKGROUND

The discussion below is merely provided for general background information and is not intended to be used as an aid in determining the scope of the claimed subject matter.

Aspects of the present invention relate to equipment and methods used during laboratory testing of bodies moving over surfaces such as but not limited to all types of vehicles traveling on a roadway.

Referring to vehicles such as automobiles by way of example, the use of simulated roadways has become important in the development of vehicle designs. These roadway simulators generally comprise one or more individual endless belts that are mounted below the vehicle, engaging one or more wheels, and/or positioned below other body panels of the vehicle. The belts are driven to simulate driving the vehicle over a road. Commonly, the roadway simulators are disposed in wind tunnels so as to measure aerodynamic characteristics. Generally, roadway simulators improve the realism of flow characteristics leading to improved measurement of aerodynamic characteristics.

The vehicle is typically restrained with respect to the simulated roadways through a linkage that restrains the vehicle from movement in longitudinal direction (fore and aft), in lateral direction (side-to-side) and in yaw (steering motion). Commonly, the vehicle restraints are passive restraints which do not affect the vehicle's dynamics, but which can be used for measuring loads if desired in the different directions of restraint.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A first aspect of the present invention is a test system that includes a platform having a movable endless belt. A restraint is configured to restrain a test article in a selected vertical position relative to the moveable belt. The restraint includes at least a pair of axially rigid supports wherein at least one rigid support is provided on each side of the movable belt and has an end configured to be secured to the test article, and wherein each support extends from a stationary portion, relative to the belt, of the platform over at least a portion of the movable belt.

In one embodiment, the test system can further include a load cell operably coupled to each support. Each load cell is configured to measure a vertical force associated with each support.

In yet another embodiment, the test system can further include an actuator coupled to each support so as to apply a selected force upon the test article. If desired, the actuators and supports are configured to lift the test article off the movable belt and/or apply a vertical force on the test article directed toward the movable belt.

Positioners can be coupled to at least one support. The positioners can be configured to adjust a longitudinal and or a lateral position of the support relative to the platform.

In a particularly advantageous embodiment, the platform is part of a wind tunnel and each of the supports are streamlined. If desired, each support can include means for adjusting airflow characteristics around the support.

Each support can include a stiffening assembly. The stiffening assembly includes an upright member on the support and elongated members extending from the upright member to each end of the support. If desired, each support can include a compartment for storing the upright member and the elongated members.

Another aspect of the present invention is a test system that includes a platform having a movable endless belt. A restraint is configured to restrain a test article in a selected position relative to the moveable belt. The restraint includes at least a pair of axially rigid supports wherein at least one rigid support is provided on each side of the movable belt and has an end configured to be secured to the test article, and wherein each support extends from a stationary portion, relative to the belt. The restraint further includes an actuator coupled to each support, wherein each actuator is configured to exert a vertical force on the test article directed toward the movable belt. If desired, the actuators and supports are configured to lift the test article off the movable belt.

In a further embodiment, the test system includes a load cell operably coupled to each support. The load cell is configured to measure a vertical force associated with each support.

In yet a further embodiment, the test system includes a strut having a first end coupled to the test article proximate at least one support and a second end configured to engage the belt as it moves so as to transfer force between belt and the test article. In a particularly advantageous embodiment, the test article comprises a vehicle and the test system includes a plurality of struts, where each strut is proximate each support and has a first end coupled to the vehicle and a second end configured to engage the belt as it moves so as to transfer force between belt and the vehicle.

Yet another aspect of the present invention is a method for testing a vehicle in a wind tunnel having an movable endless belt. The method includes coupling the vehicle to rigid supports that restrain the vehicle in a selected vertical position relative to the movable belt, the rigid supports extending from a stationary portion in the wind tunnel over a portion of the movable belt; and restraining the vehicle during application of blowing air upon the vehicle and moving the movable belt.

If desired, the method can further include applying a selected vertical force through each of the supports to the vehicle during application of blowing air upon the vehicle and moving the movable belt, and/or lifting the vehicle off the movable belt using the supports.

DETAILED DESCRIPTION OF THE ILLUSTRATIVE EMBODIMENTS

Figure 1:
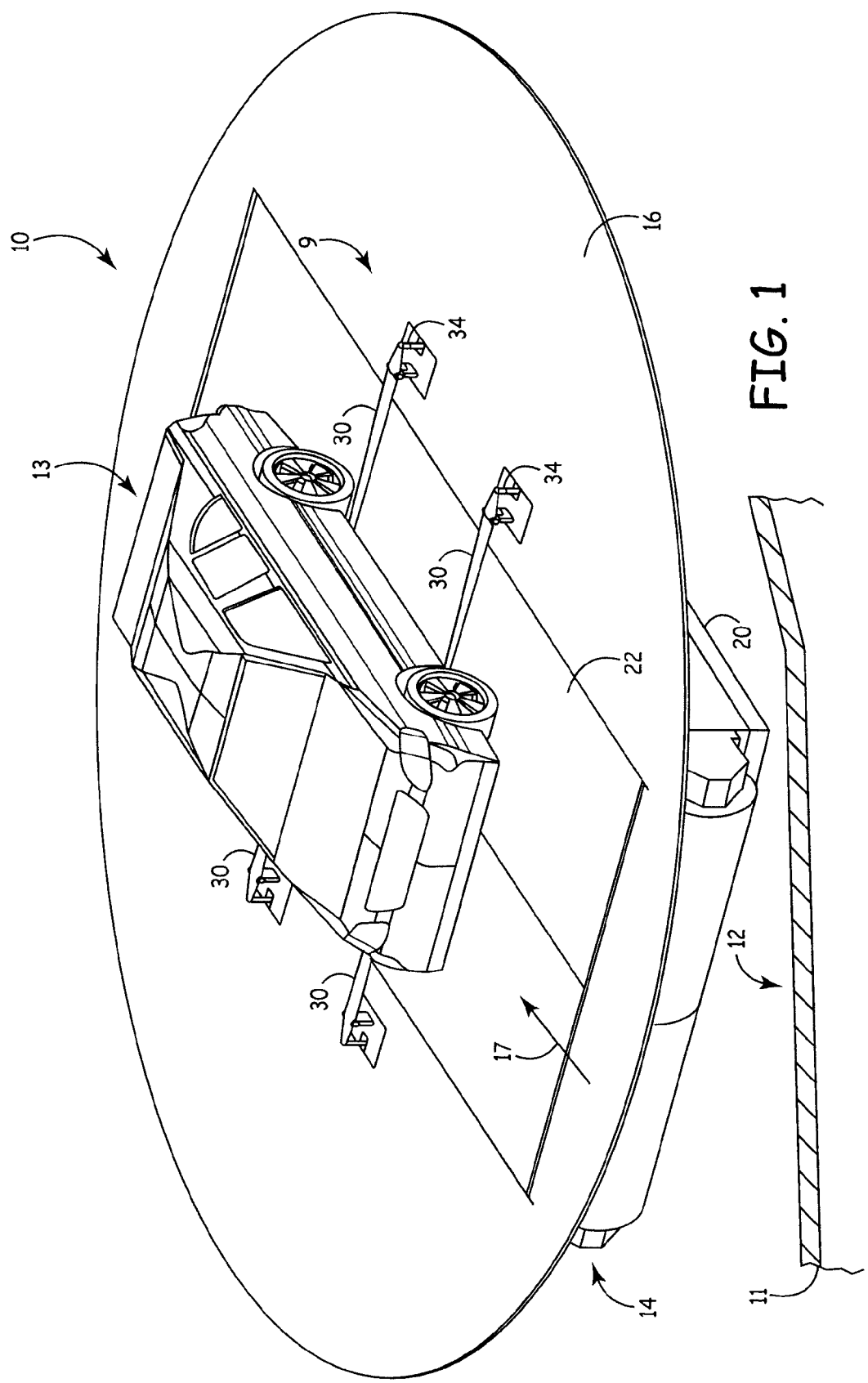
FIG. 1 is a perspective view of a first embodiment of a vehicle restraint system.

Referring to FIG. 1, a vehicle restraint 9 and simulation system 10 having one or more aspects of the invention is illustrated. In the embodiment illustrated, a vehicle 13 is an automobile; however, it should be understood that this is but one example of a vehicle that can benefit from aspects of the present invention. For that matter, any type of test article restrained relative to a moving surface provided by an endless belt can benefit from one or more aspects of the present invention; however, particular advantages are realized for a vehicle moving over a roadway surface.

In the embodiment illustrated, the system 10 includes a support base 11, which generally comprises a large concrete structure having a pit indicated generally at 12 in which the main roadway mechanisms 14 are mounted so that the vehicle 13 to be tested is at about the level of the surface surrounding the pit 12. In many instances, the system 10 forms part of a wind tunnel having a fan, not shown, but represented by arrow 17. The vehicle 13 and the main roadway mechanism 14 can include a platform 16, which, in the embodiment illustrated, is a turntable that allows the vehicle 13 to be positioned selectively with respect to the air flow generated by the fan.

The platform 16 and the main roadway mechanisms 14, although not necessary, can be mounted on a balance assembly, schematically illustrated at 20, which can measure various forces upon the vehicle 13. Such balance assemblies, which can take many forms, are well known in the art and need not be further discussed for purposes of the present application. However, one suitable balance assembly is described in United States Published Patent Application 2007/0039400, which is hereby incorporated by reference in its entirety. In an alternative embodiment, the balance mechanism can be integrated in the system 10 as described in U.S. Pat. No. 7,360,443, which is hereby incorporated by reference in its entirety.

It should also be noted that the roadway mechanism 14 herein illustrated includes a single endless belt 22 upon which the vehicle 13 is supported. As appreciated by those skilled in the art, aspects of the present invention can be applied to roadway mechanisms that comprise two or more belts used to support the vehicle 13 and/or are positioned under various portions or proximate to panels of the vehicle 13. All of the belts, if more than one is present, are driven by suitable motors and rollers, the details of which are well known, and not necessary for understanding aspects of the present invention.

Referring now to the vehicle restraint 9, in one form, the vehicle restraint 9 restrains and can control the position of the vehicle 13 on the belt(s) 22, and in particular, control a vertical position of the vehicle and/or measure loads or forces on the vehicle 13. In another aspect, the restraint 9 has the ability to lift the vehicle 13 upwardly relative to the platform 16 or belt 22 so as to perform work upon the vehicle 13 such as to access the underside of the vehicle 13 to replace components. The restraint 9 should have as minimal effect on air flow around the vehicle 13 as possible during testing. As such supports 30 that extend from "stationary" portions of the platform 16 (relative to belt 22) on opposite sides of the vehicle 13 over portions of the belt 22 are provided. The supports 30 are axially (along their longitudinal length) rigid or stiff and generally aerodynamic (e.g. slender and/or streamlined in shape) to minimize airflow disturbance.

Figure 2:
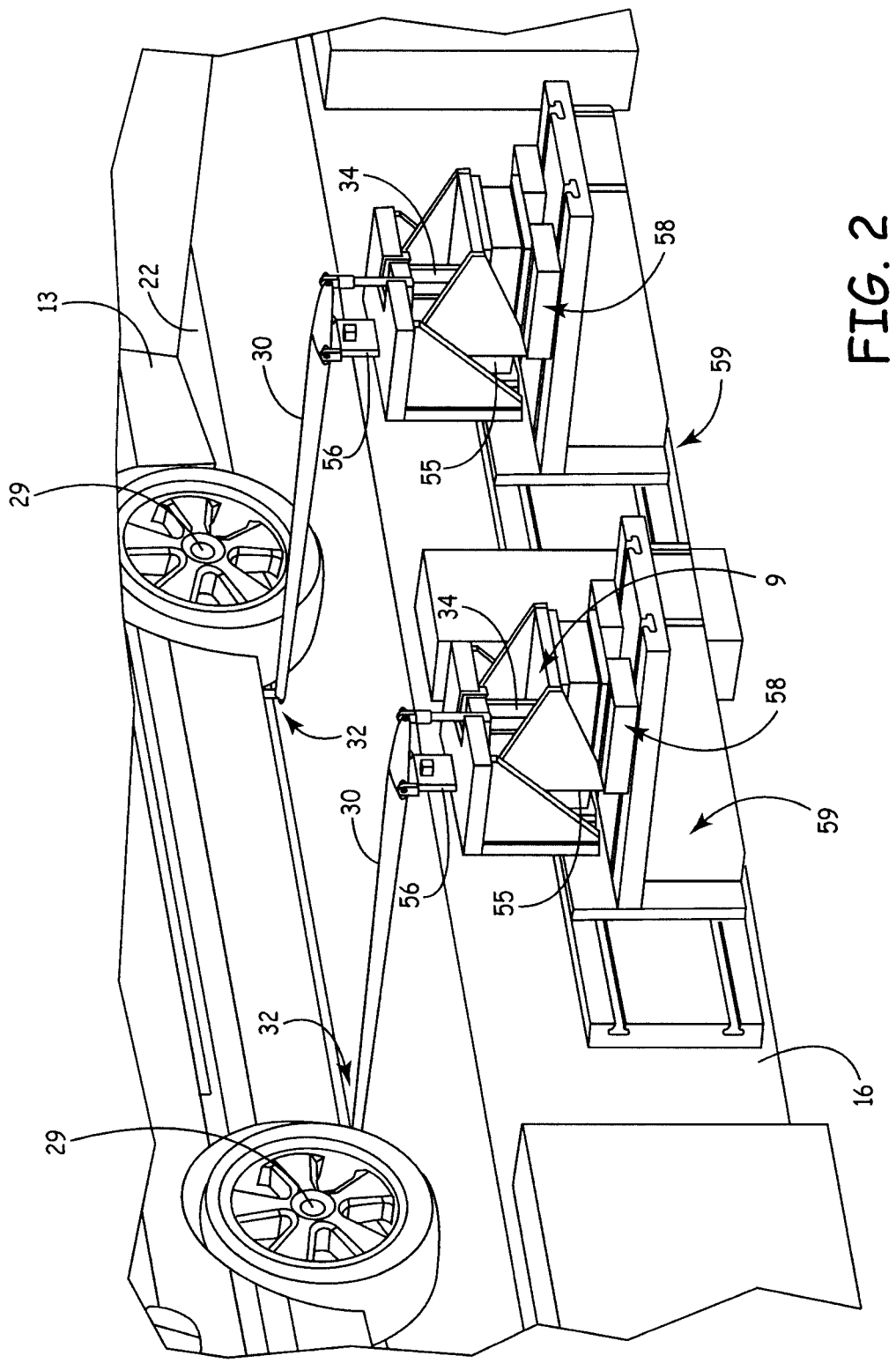
FIG. 2 is an enlarged perspective view of a portion of the first embodiment.
Figure 3:
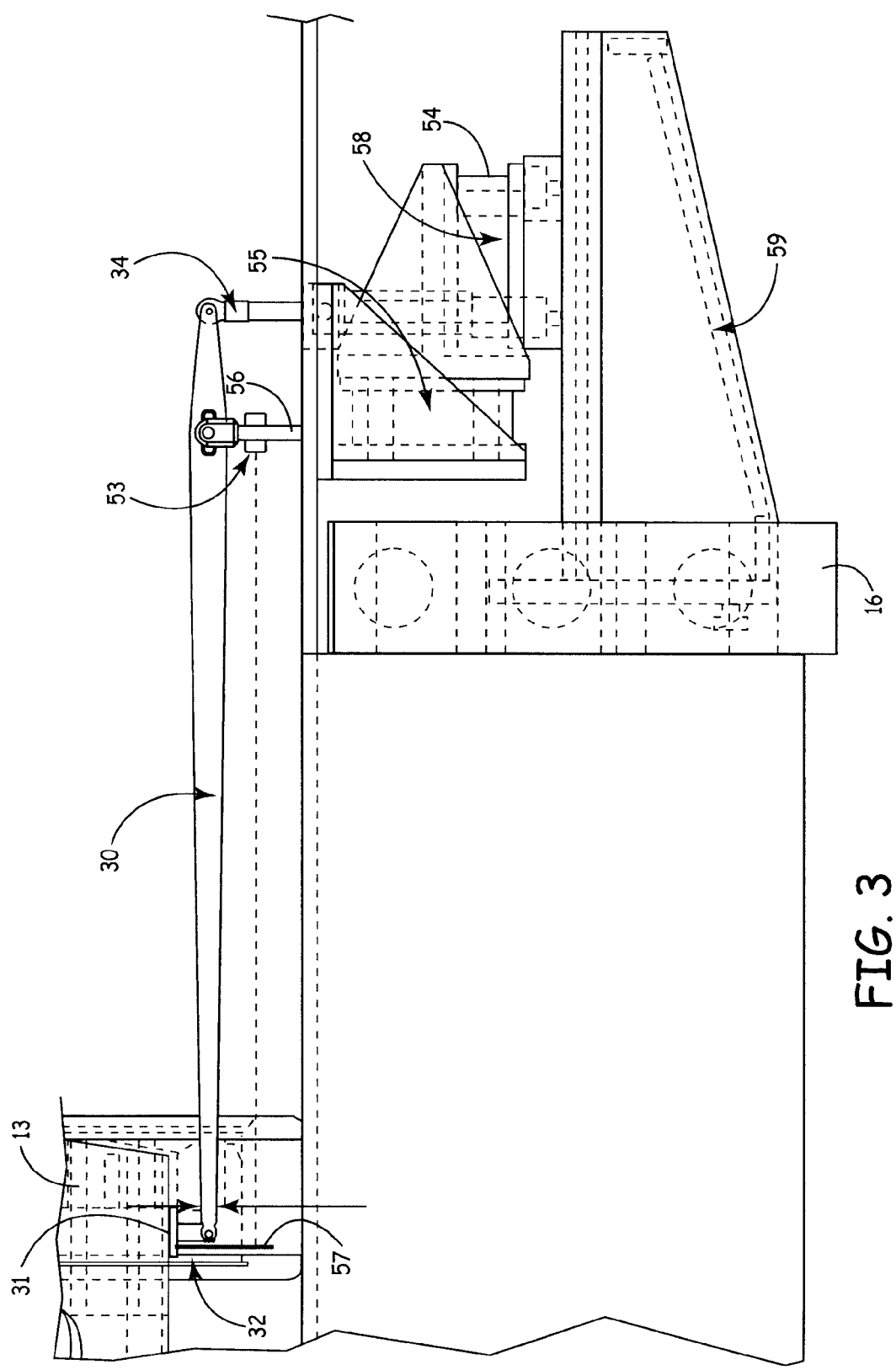
FIG. 3 is a front elevational view of the first embodiment.

Referring to FIGS. 2 and 3, couplers 32 are coupled to attachment points 31 of the vehicle 13, which may already be available, or may require slight modification such as by providing suitable flanges, thereby allowing the vehicle to be rolled onto the belt 22 and quickly secured. In general, each of couplers 32 is joined through each respective support 30 to an actuator 34. Selective control of each of the actuators 34, allows the operator to obtain desired characteristics of the vehicle 13 such as vehicle position, ride height, etc., which furthermore can be adjusted while the vehicle 13 is rolling on the belt 22. In addition, when desired, the actuators 34 can be controlled so as to lift the vehicle 13 completely off the belt 22. It should be noted that although illustrated where each support 30 is attached to a body portion of the vehicle 13, this is not limiting. If desired, as is known in the art, couplers can be provided on the end of each support to connect the support 30 to a wheel hub 29 (FIG. 2).

Aerodynamic characteristics of the vehicle 13 such as drag are can be obtained with the system 10 by restraining the vehicle 13 with vehicle restraint 9 in a manner so as to generally hold the vehicle in a somewhat soft or compliant manner while the belt 22 is run for a relatively long period of time such as but not limited to 20-30 seconds. Having a relatively long test period allows trembling or buffeting that the vehicle 13 may experience to be averaged out so that the average or mean load values obtained can be used.

Figure 4:
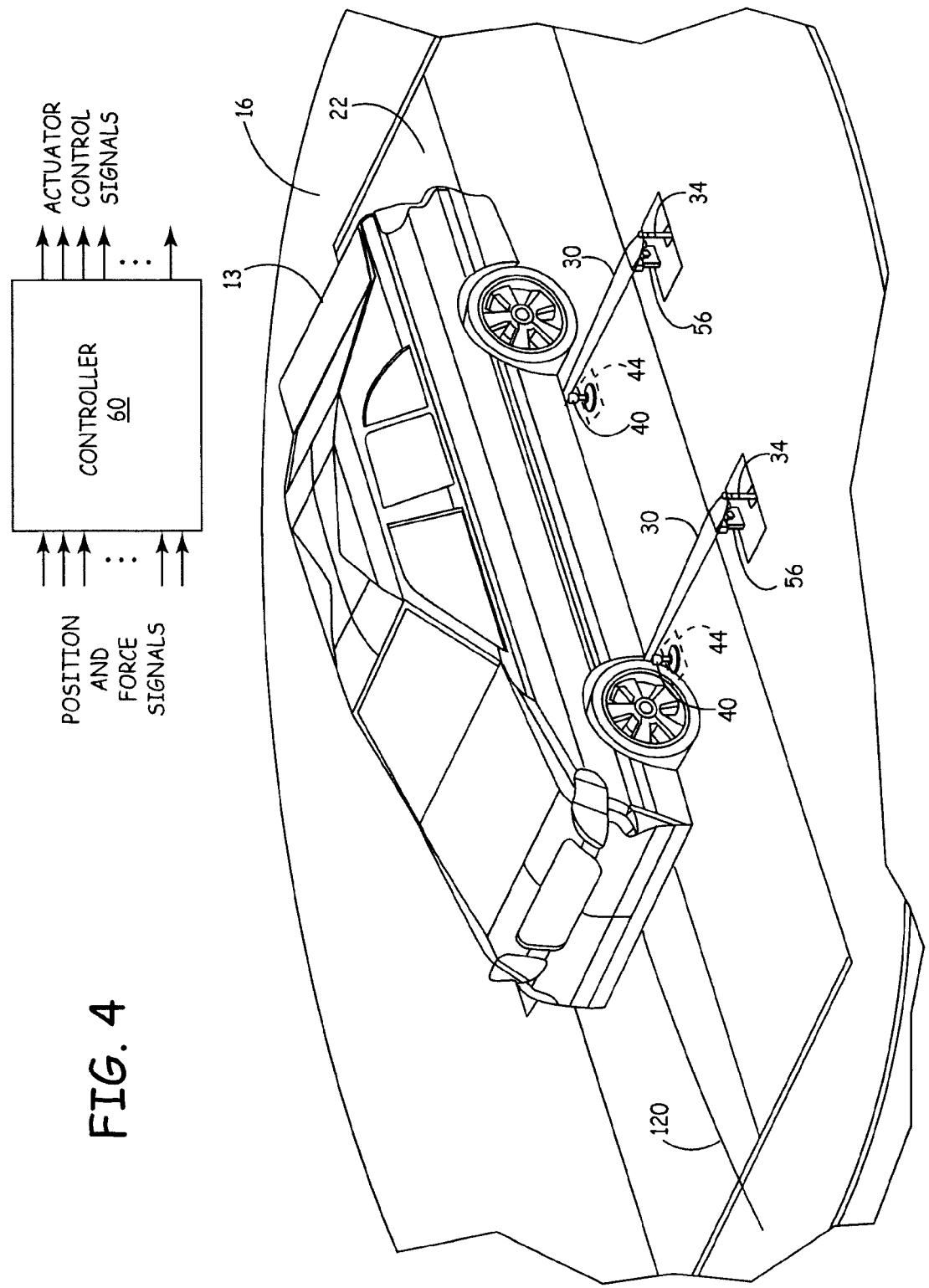
FIG. 4 is a perspective view of a second embodiment of a vehicle restraint system.
Figure 5:
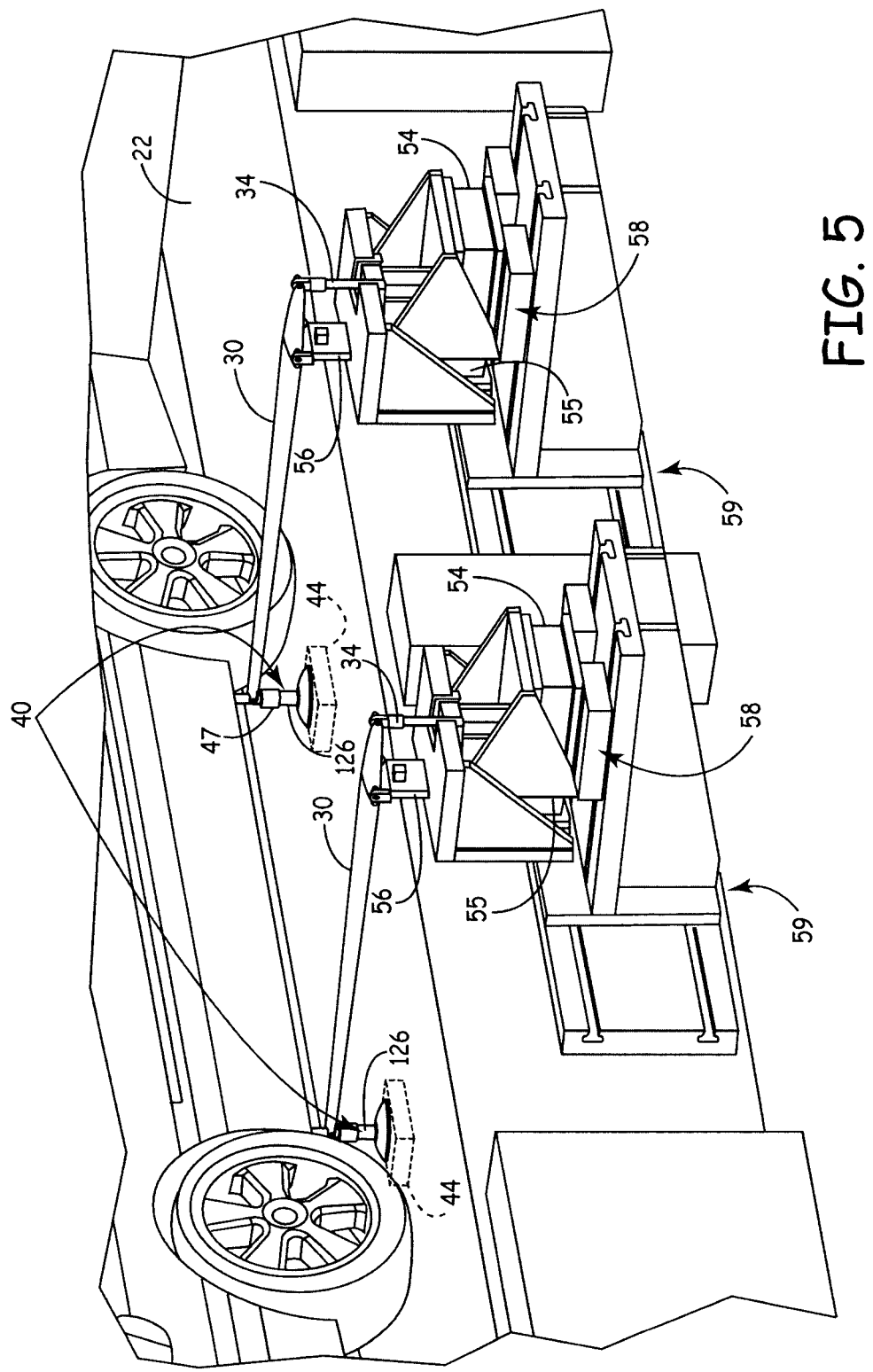
FIG. 5 is an enlarged perspective view of a portion of the second embodiment.
Figure 6:
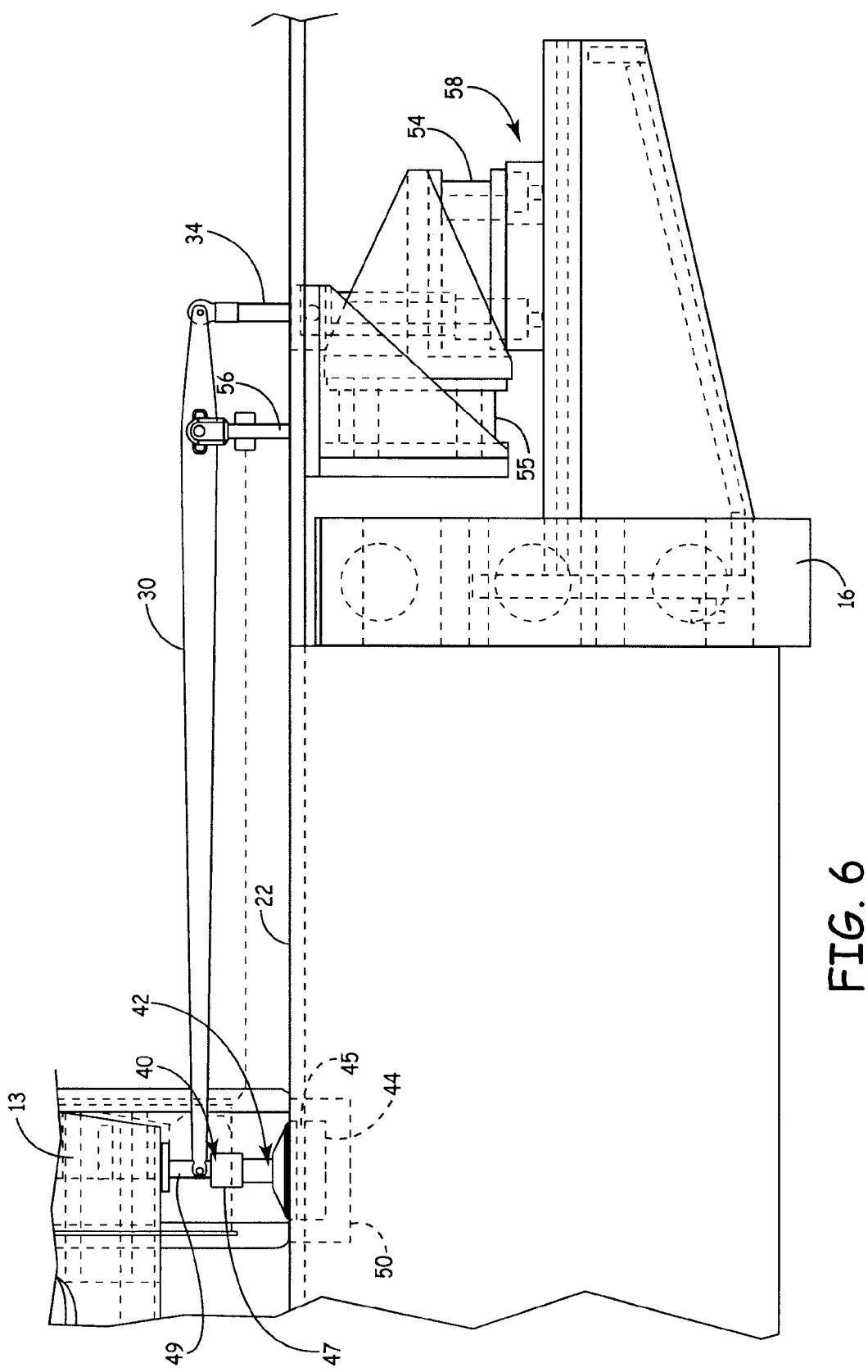
FIG. 6 is a front elevational view of the second embodiment.

However, in a second form of a test, the trembling or buffeting characteristics of the vehicle 13 are desired. As another aspect of the invention, this is obtained by holding the frame of the vehicle 13 in a rigid manner so as to minimize any oscillation of the vehicle 13 on its tires. In this manner, the forces being applied to the body of the vehicle 13 from buffeting can be measured. In order to maintain the vehicle 13 in a rigid manner using only the supports 30 would require the supports 30 to be very stiff. To provide the required stiffness, the supports 30 may be designed to be relatively large. However, this is not desired, because as the size of the supports increases so does their disturbance of the airflow in the wind tunnel. However, as another aspect of the invention, by providing one, two or typically four struts 40, as illustrated in FIGS. 4-6, that are joined to the vehicle 13 such as to the frame of the vehicle or coupler 32, vertical loads of the vehicle 13 can be reacted down to and through belt 22. It should be noted strut(s) 40 can be used on any of the exemplary embodiments herein disclosed.

It should be understood that each of the struts 40 include, on end opposite the end joined to the vehicle or coupler 32, a coupling 42 that allows the vertical forces to be applied to the belt 22. In one embodiment, coupling 42 can be a fluid (e.g. air or liquid) bearing that slides with minimal friction upon the upper surface of the belt 22. Vertical forces carried by each strut 40 are reacted through the fluid bearing upon the belt 22. If necessary, a suitable reaction structure indicated by dashed block 44 is provided under the portion of the belt 22 having the strut 40. If necessary, a fluid bearing coupling can be provided between belt 22 and reaction structure 44. In short, the vehicle 13 is retained in a stiff manner due to the stiffness provided by the vertical struts 40 (possibly, in combination with vertical stiffness from the supports 30), while lateral stiffness is provided by the supports 30. It should be noted, that additional mass can be provided in the vehicle in order to increase the weight of the vehicle 13 as an aid in maintaining the vehicle 13 in a stiff manner. A particular advantage of the vertical struts 40 is that they are relatively small, and thus, do not disturb the airflow around the vehicle 13 very much. If desired, outer surfaces can be configured in a streamlined manner to further reduce airflow disturbances. In addition, as illustrated, the struts 40 can be positioned proximate to and/or in-line with the tires or wheel assemblies of the vehicle 13 to further reduce airflow disturbances.

Referring to FIG. 6, in some systems a load cell 50 is provided under each tire of the vehicle 13 so as to measure vertical forces through the belt 22. However, the presence of the vertical struts 40 will cause some vertical loads to pass through the struts 40 to reaction structure 44. In view of this situation, it may be necessary to ascertain the vertical loads passing through each of the struts 40. Such loads can be measured using a variety of techniques that include a load cell 45 operably coupled to the reaction structure 44, a load cell 47 in each strut 40 or a load cell 49 in the load path coupling each strut 40 to the vehicle 13 or coupler 32. Load cells 45, 47, and 49 enable the measurement of trembling or buffeting characteristics of the vehicle with stiff restraint of the vehicle. In the particular configuration illustrated, load cell 49 might be used to measure such loads in one or more directions of vertical (into the belt 22), lateral (across the belt 22), and longitudinal (orthogonal to lateral) orientation. When the struts 40 are not present such as in the case of the first test mentioned above, vertical loads can be obtained from the load cell 50 and/or in combination with a suitable load cell coupled to each support 30 remote from the vehicle 13 such as at 55, which is coupled to the actuator 34 and support 56.

As indicated above, each support 30 is coupled to actuator 34 that can be used to lift the vehicle 13 off the belt 22 when desired and/or can be used to adjust the ride height, control the ride height and/or apply other vertical loads upon the vehicle during testing. It should be noted adjusting the ride height is to obtain a desired vertical position of the vehicle and then perform some form of testing at the selected ride height, while ride height control is a form of testing to control the vertical position so as to obtain a desired set-point of ride height, or to control the vertical position of the vehicle 13 to follow a command signal, which commonly involves a feedback loop measurement of position.

Actuator 34 like all actuators herein mentioned can be hydraulic, pneumatic and/or electric. Commonly, a position sensor is provided to measure the position of the vehicle 13. Referring to FIG. 3, a camera 55 is provided and monitors a target 57 coupled to the vehicle 13 or end of the support 30, although other forms of electric (e.g. resistive, inductive or capacitive) or optical position sensors can be used.

In the embodiment illustrated, each support 30 is pivotally coupled to a support fixture 56 where an end of each support 30 remote from the vehicle 13 is coupled to the lift actuator 34. In view that each support pivots at or on a support fixture 56, it may be necessary to provide lateral compensation. In the embodiments illustrated in FIGS. 1-6, compensation is provided by a lateral positioner 58 that can carry the lift actuator 34 and support fixture 56 as well as a load cell 54 that measures horizontal loads (generally transverse and/or parallel to simulated vehicle motion) and a load cell 55 that measures vertical loads (generally orthogonal to simulated vehicle motion). The positioner 58 can take many forms as appreciated by those skilled in the art. Commonly, the positioner 58 includes two elements moving via a guide track under the control of an actuator with suitable sensors providing position information back to a controller 60 (FIG. 4). In a further embodiment, the lateral positioner 58 is also supported on platform 16 by a longitudinal positioner 59. Like the lateral positioner 58, the longitudinal positioner 59 can take many forms as appreciated by those skilled in the art. Commonly, the positioner 59 includes two elements moving via a guide track under the control of an actuator with suitable sensors providing position information back to the controller. The longitudinal positioner 59 allows longitudinal positioning of each corresponding support 30.

As appreciated by those skilled in the art, a particular advantage of the restraint 9 via the actuators 34 and positioners 58 allows the vehicle 13 to be lifted, serviced and then restored back to its previous position, thereby minimizing errors associated with having to conduct the same motions with different vehicle positioning and lifting configurations. Likewise, the ease in which the supports 30 and/or struts 40 can be positioned (by positioner 59) and/or attached to the vehicle 13 with minimal modifications to the vehicle 13, makes the restraint 9 easy to apply, thus, it can be used on common vehicles (e.g. passenger automobiles and trucks). The fact that the restraint 9 need not be removed and/or a separate lift mechanism be employed decreases downtime and increases testing efficiency.

Figure 7:
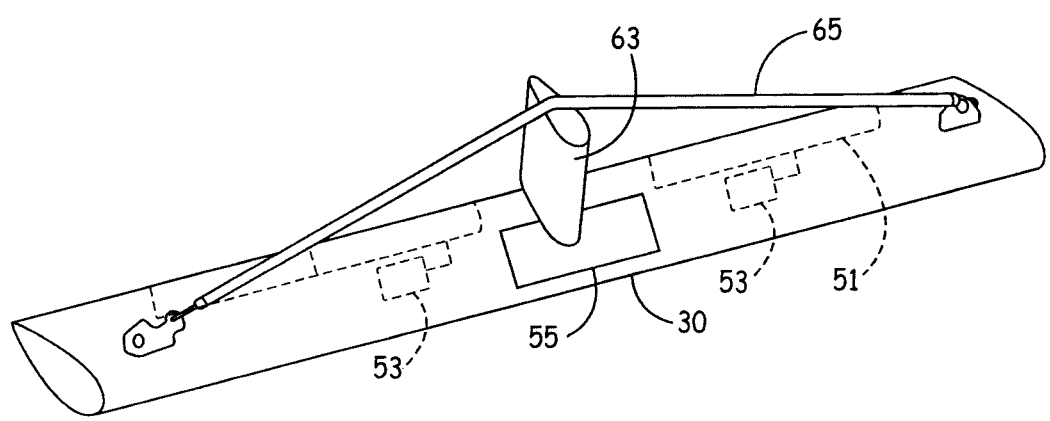
FIG. 7 is a perspective view of a support with components removed.

FIG. 7 illustrates additional structure that can be included on support 30 so as to increase stiffness. In particular, an upstanding projection 63 is provided along the longitudinal length of the support 30, for example, approximately at its midpoint; however, such a location should not be considered its only position. In the embodiment illustrated, upstanding projection 63 is also streamlined. A cable or tension wire 65 (which also represents a rod) is fastened proximate each end of the support 30 and extends over upstanding projection 63. With the cable or wire 63 in tension, the stiffness of support 30 is increased. It should be noted that coupler 32 and other elements such as support fixture 56 are not shown in this figure but nevertheless would be included.

If desired, characteristics of the airflow pass the support 30 can be adjusted so as to control operational characteristics of the support 30 such as but not limited to any forces and/or other forms of compensation (e.g. damping) to be provided by the support 30. Attributes of the strut such as its geometry can be changed by manually or remotely adjusted control surfaces 51 located anywhere on the strut and/or texture of the support 30. The control surfaces 51 can be adjusted by suitable actuators 53, if desired under the control of controller 60.

Figure 8:
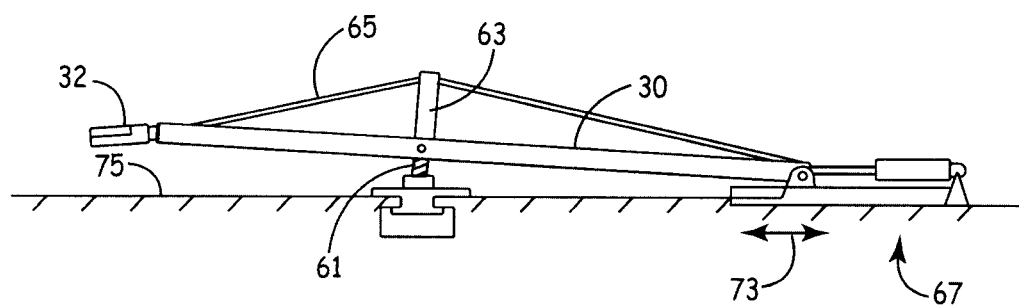
FIG. 8 is schematic front elevation view of another support.
Figure 9:
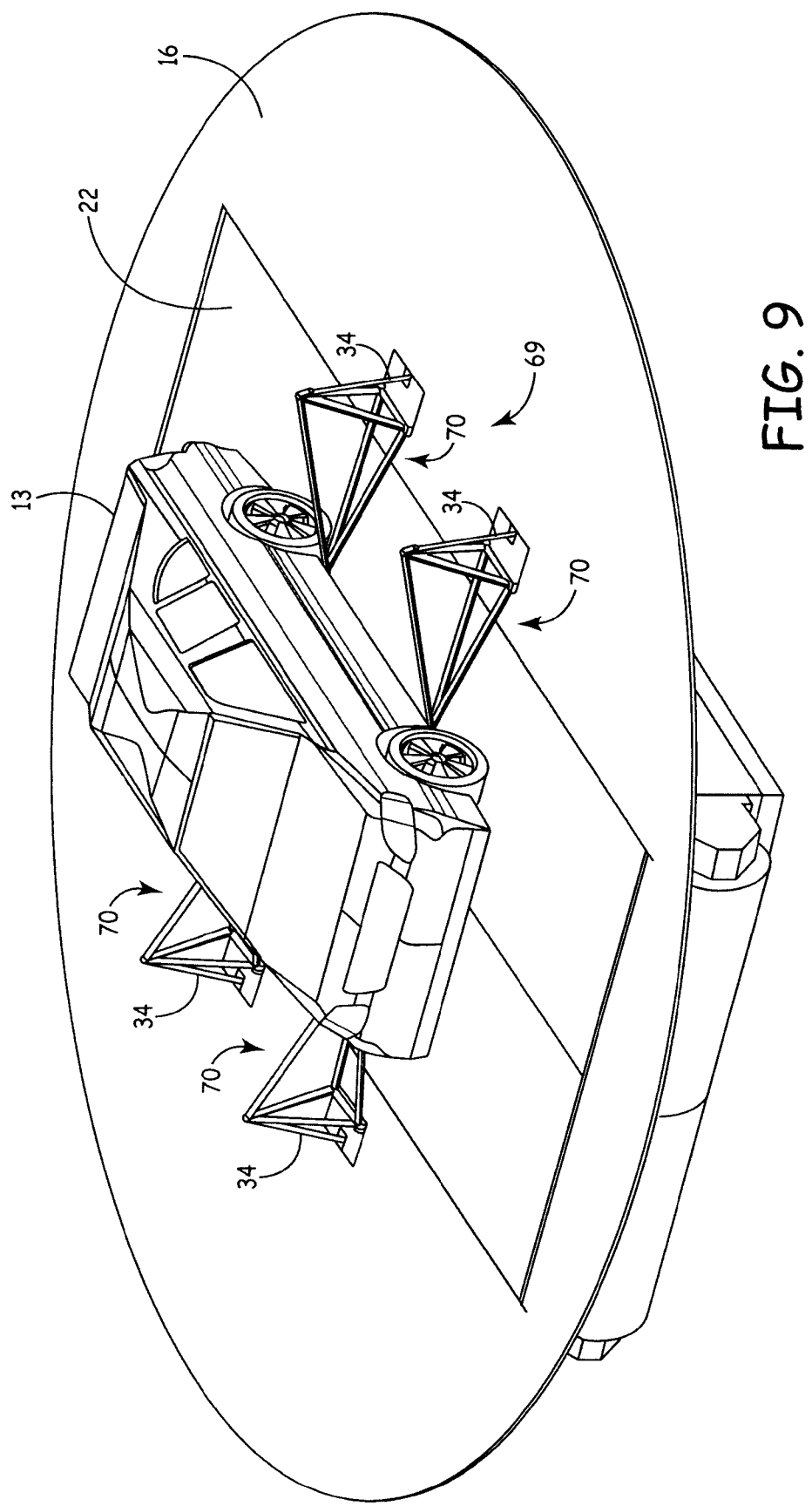
FIG. 9 is a perspective view of a third embodiment of a vehicle restraint system.
Figure 10:
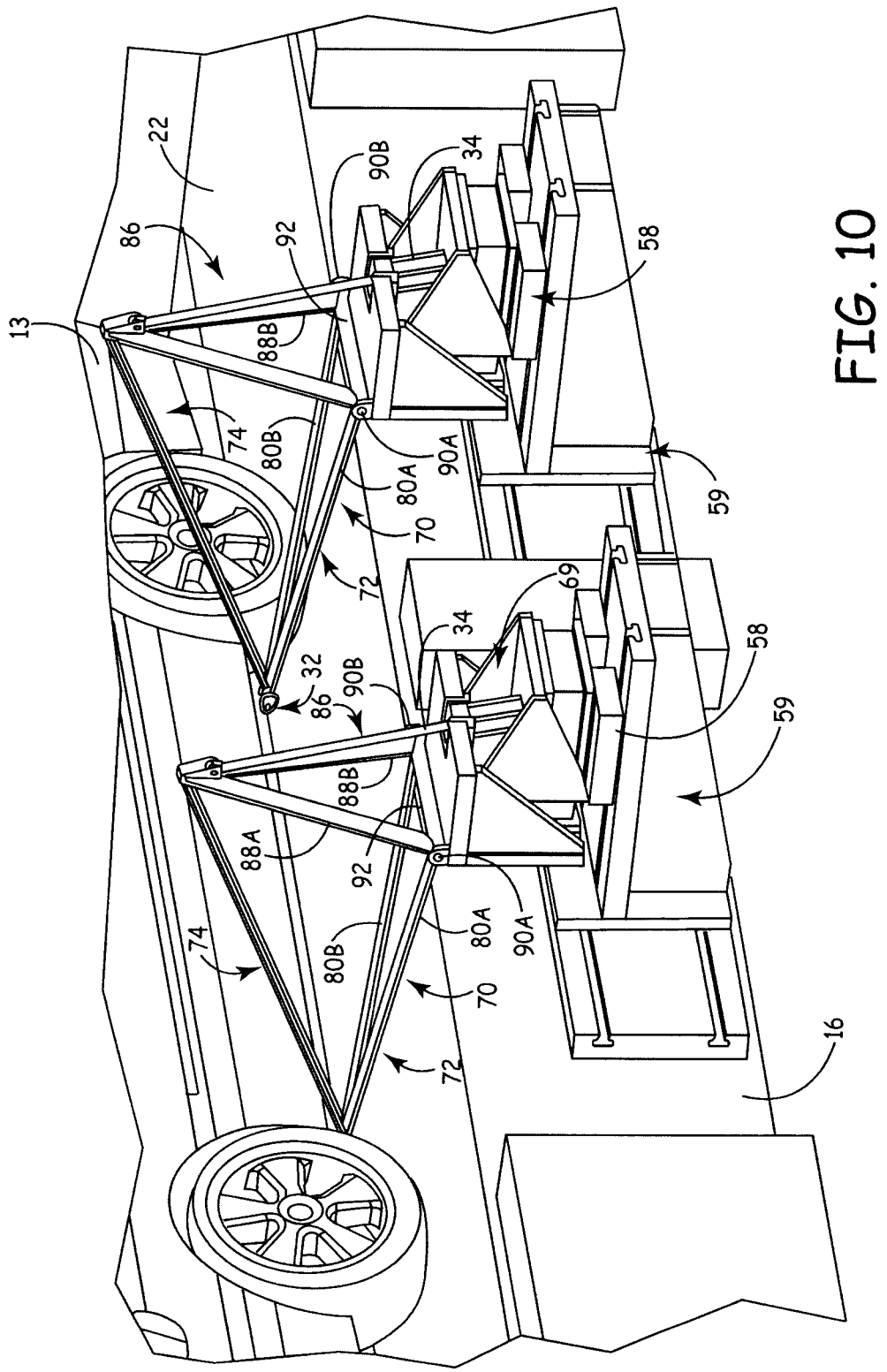
FIG. 10 is an enlarged perspective view of a portion of the third embodiment.
Figure 11:
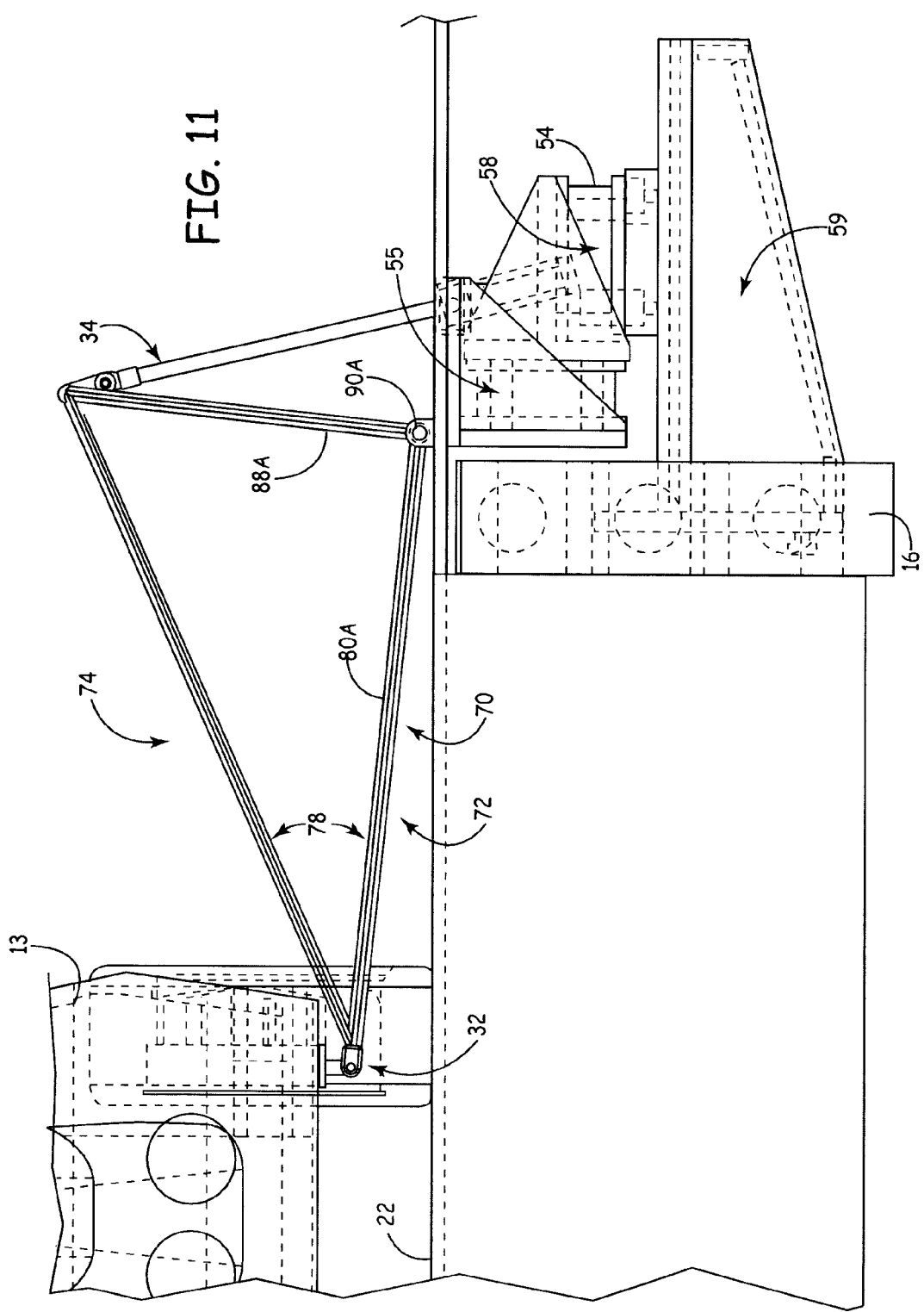
FIG. 11 is a front elevational view of the third embodiment.

Also, if desired, the support 30 can include a compartment(s) 55 of size and shape to store components such as projection 63, wire 65, coupler 32, and/or other components associated with use of the support 30. Storage of one or more of these components in the support 30 reduces the chances that the components are lost, thereby minimizing the time needed to deploy the support 30 when its use is desired. FIG. 8 illustrates another support 30 that can also restrain and/or control the position of the vehicle 13 during testing as well as can lift the vehicle off the belt 22 for servicing if desired. It should be noted that elements identified with the same numbers perform the same function and have the same characteristics as that discussed above. In this embodiment, a lift actuator 61 is coupled to support 30, herein below upstanding projection 63; however, such a location should not be considered its only position. Actuator 61 can be used to lift support 30, and thus, the vehicle for servicing as well as during testing such as to adjust or control ride height, and/or provide a downwardly directed force. It should be understood that the actuator 61 can be used on the support 30 not having the upstanding projection 63 and cable or wire 65. Furthermore, as appreciated by those skilled in the art, the lift actuator 61 and its location along the longitudinal length of the support can also be used with the other support configurations described below. A lateral positioner 67 is coupled to an end of the support 30 remote from the coupler 32 and can move the support in the direction indicated by double arrow 73 as necessary. It should be noted that the surface 75 indicated in FIG. 8 and similar surfaces illustrated below in other figures are not intended necessarily to be an upper surface of the platform 16 in the wind tunnel, but rather, a surface of the platform 16, which could include a surface located below the upper surface. Hence, some of the components illustrated in FIG. 8 and other figures below would project up through the upper surface and typically each have a streamlined configuration. Alternatively, or in addition, portions of the support 30 such as positioner 67 illustrated in FIG. 8 and components in other figures may be outside the wind tunnel in a lateral direction away from the vehicle.

Figure 12:
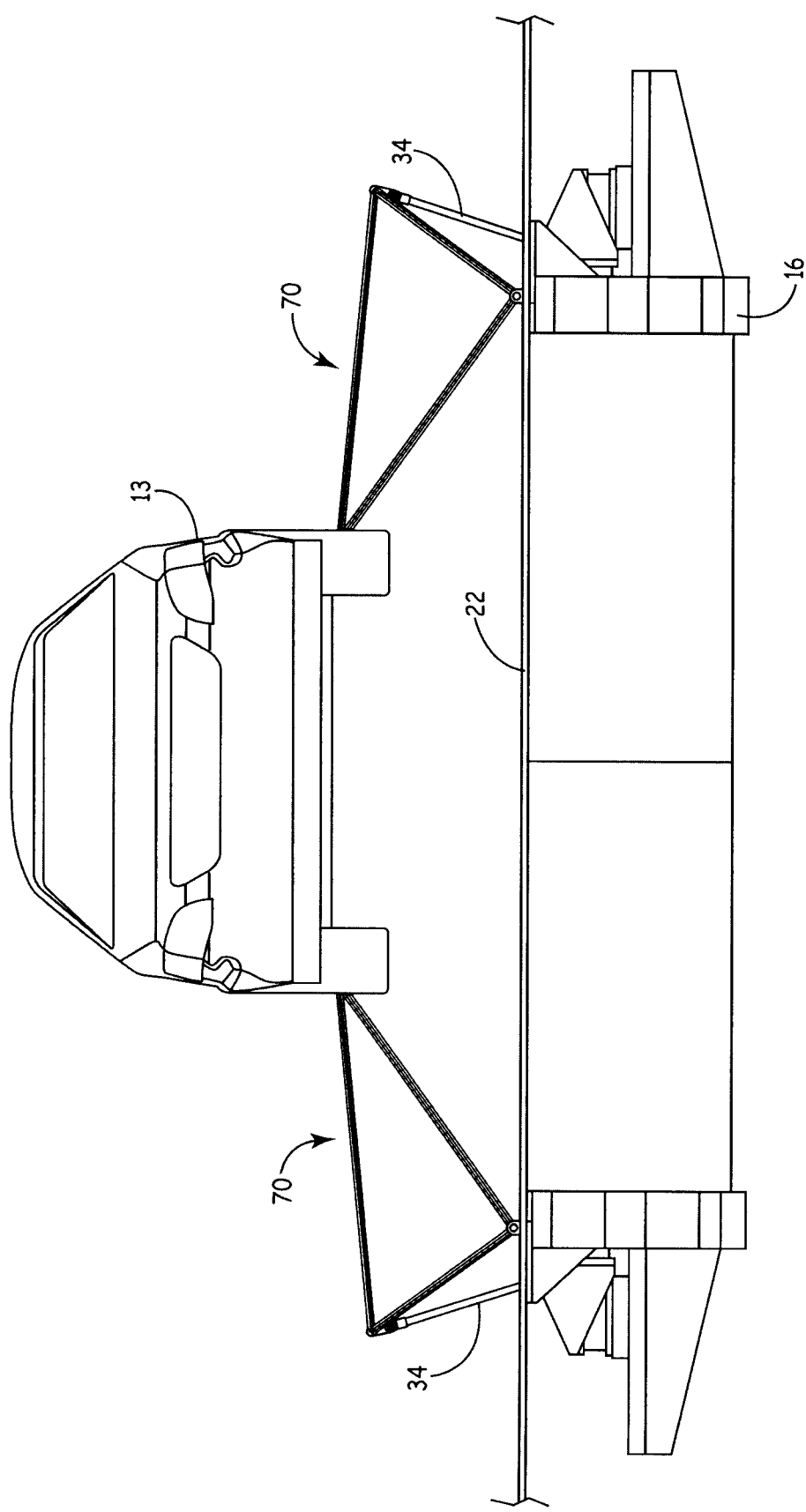
FIG. 12 is a front elevational view of the third embodiment with the vehicle lifted.

FIGS. 9-12 illustrate another restraint 69 that can also restrain the vehicle 13 during testing as well as can lift the vehicle off the belt 22 for servicing (FIG. 12). It should be noted that elements identified with the same numbers perform the same function and have the same characteristics as that discussed above. In this embodiment, supports 70 extend from "stationary" portions of the platform 16 (relative to belt 22) on opposite sides of the vehicle 13 over portions of the belt 22 and are generally aerodynamic (e.g. slender and/or streamlined in shape) to minimize airflow disturbance, although longitudinal positioners can be included. Each support 70 includes a lower extension 72 and an upper extension 74 both of which are joined to coupler 32, but extend away from the coupler 32 at an obtuse angle 78 relative to each other. In the embodiment illustrated, the lower extension 72 is formed as a pair of struts 80A and 80B that converge at coupler 32, but have ends remote from coupler 32 that are spaced apart. The lift actuator 34 is joined to the upper extension 74. An end assembly 86 is joined to the lower extension 72 (struts 80A, 80B) and the upper extension 74 so as to form a lever arm that can be used to lift the vehicle 13 as well as provide a downwardly directed force when it is desired to hold the lower portion of the vehicle 13 in a rigid manner such as during the test described above. In the exemplary embodiment, the end assembly 86 includes two struts 88A, 88B that are each joined to an end of the upper extension 74 remote from the vehicle 13, and wherein opposite ends of struts 88A, 88B are joined to struts 80A, 80B, respectively, at connections 90A and 90B. An additional strut 92 is joined to and extends between connections 90A and 90B and functions as a pivot for each strut 70. The lower extension 72 provides lateral rigidity herein by struts 80A, 80B and strut 92.

Figure 13:
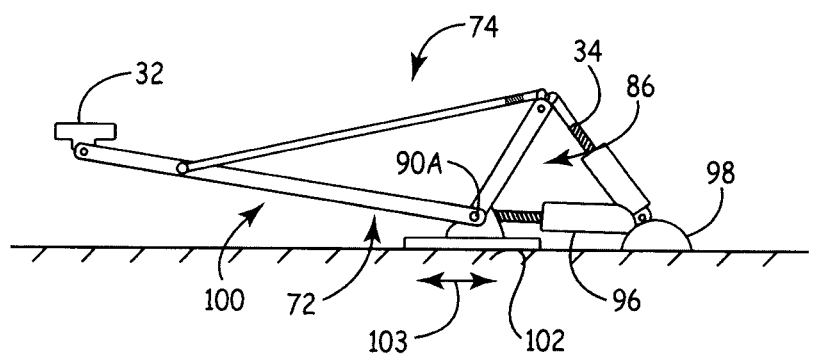
FIG. 13 is schematic front elevation view of another support.
Figure 14:
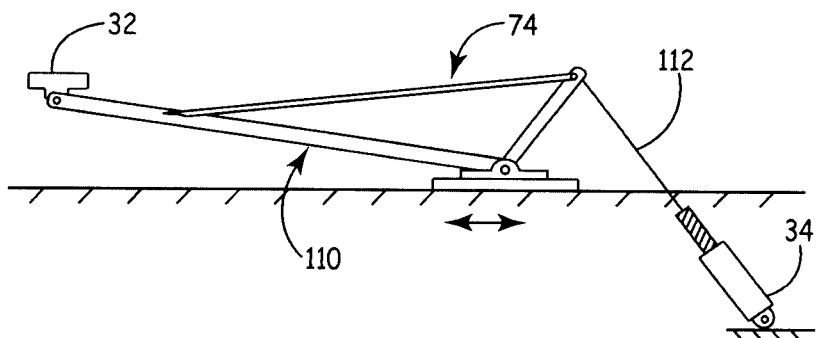
FIG. 14 is schematic front elevation view of yet another support.
Figure 15:
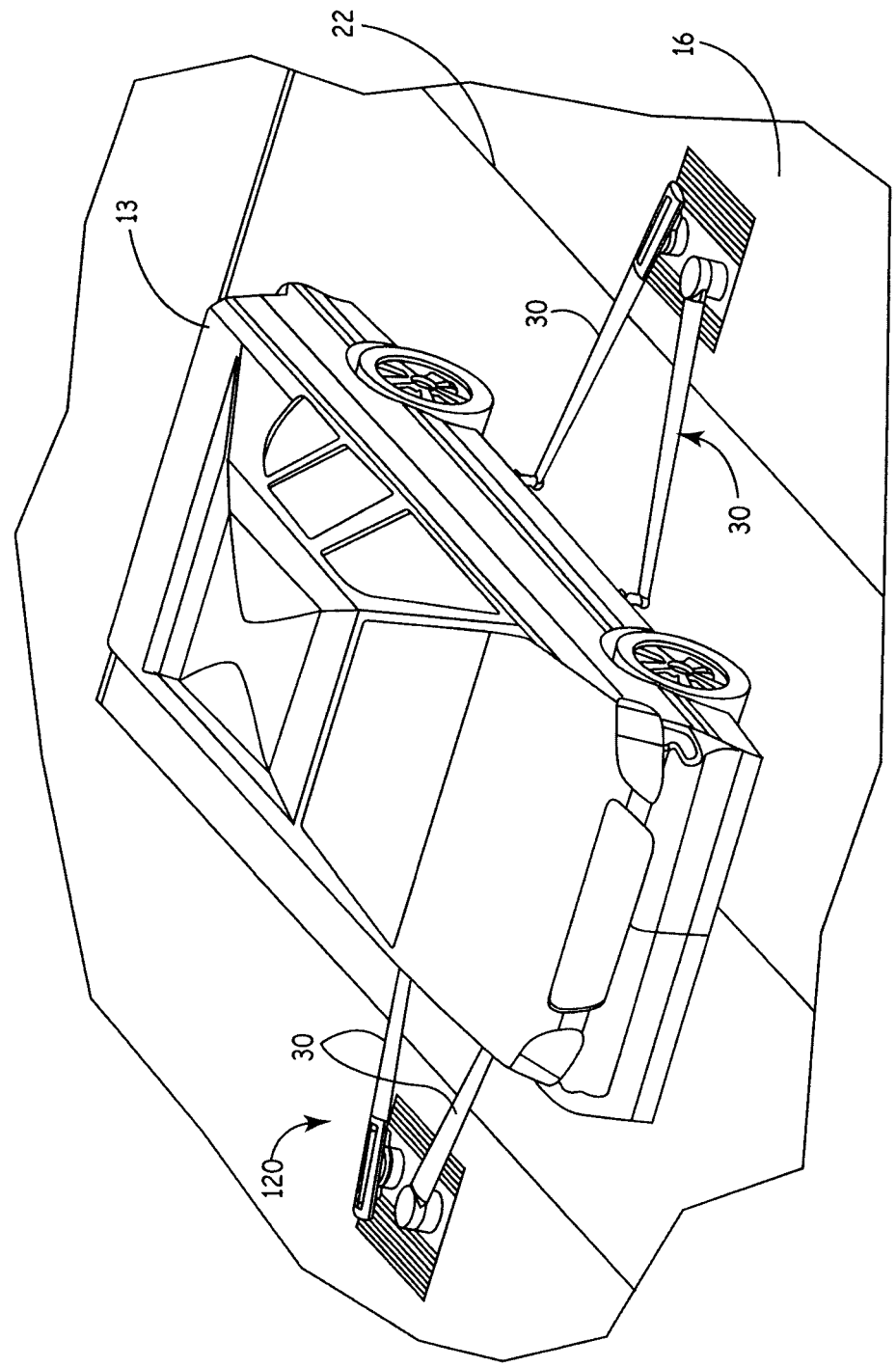
FIG. 15 is a perspective view of a fourth embodiment of a vehicle restraint system.
Figure 16:
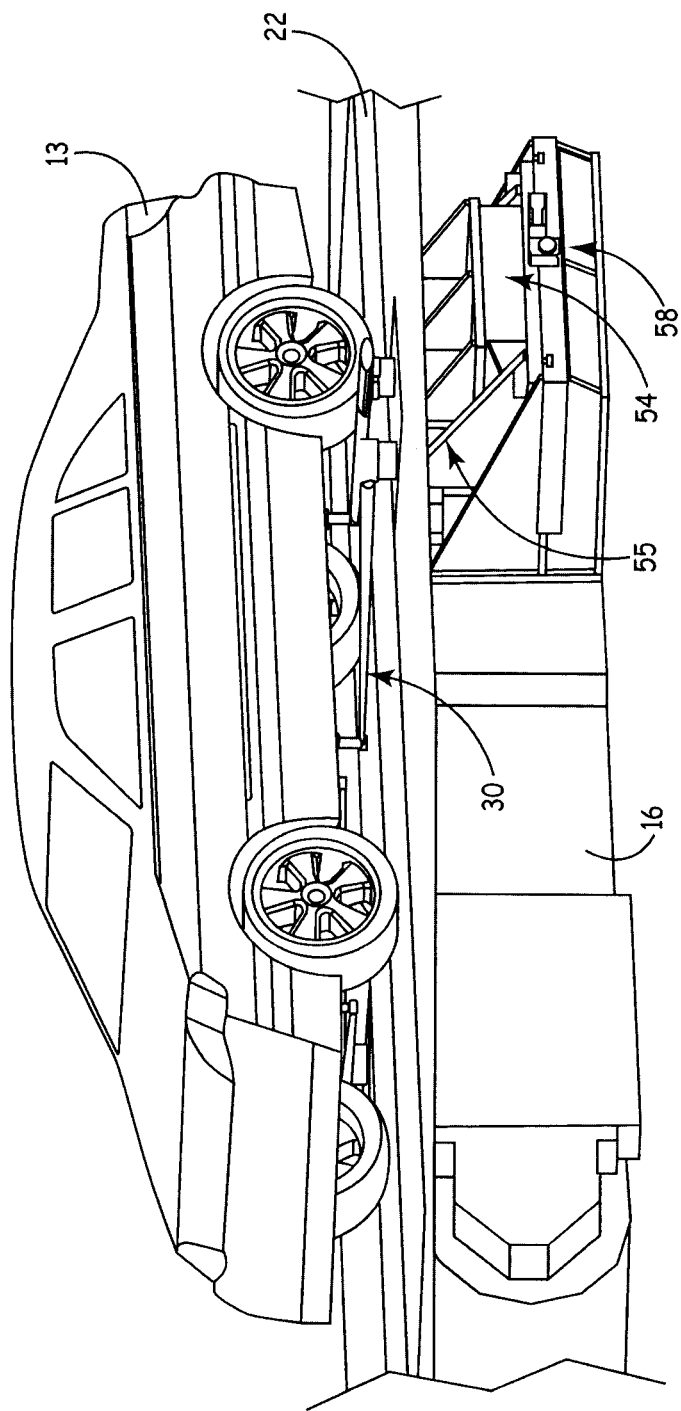
FIG. 16 is an enlarged perspective view of a portion of the fourth embodiment.
Figure 17:
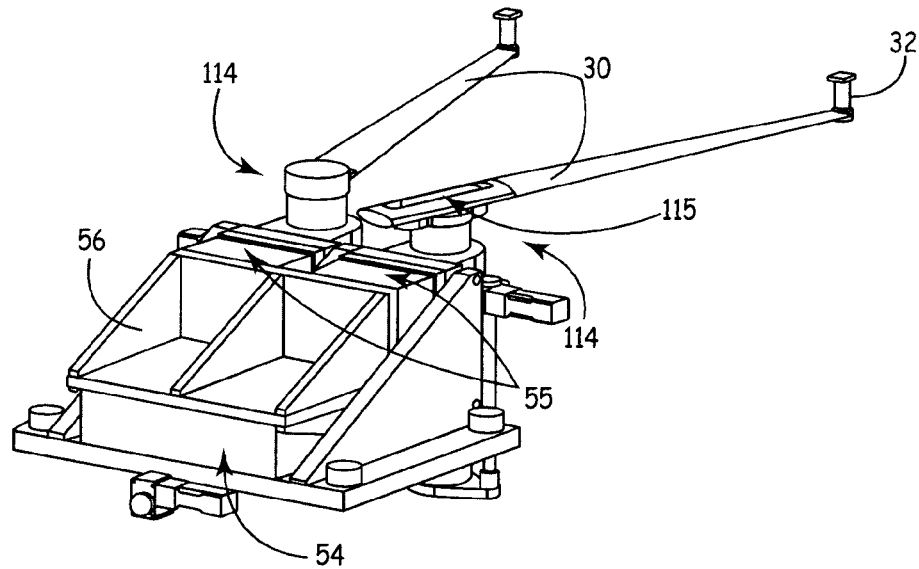
FIG. 17 is a perspective view of support assembly.
Figure 18:
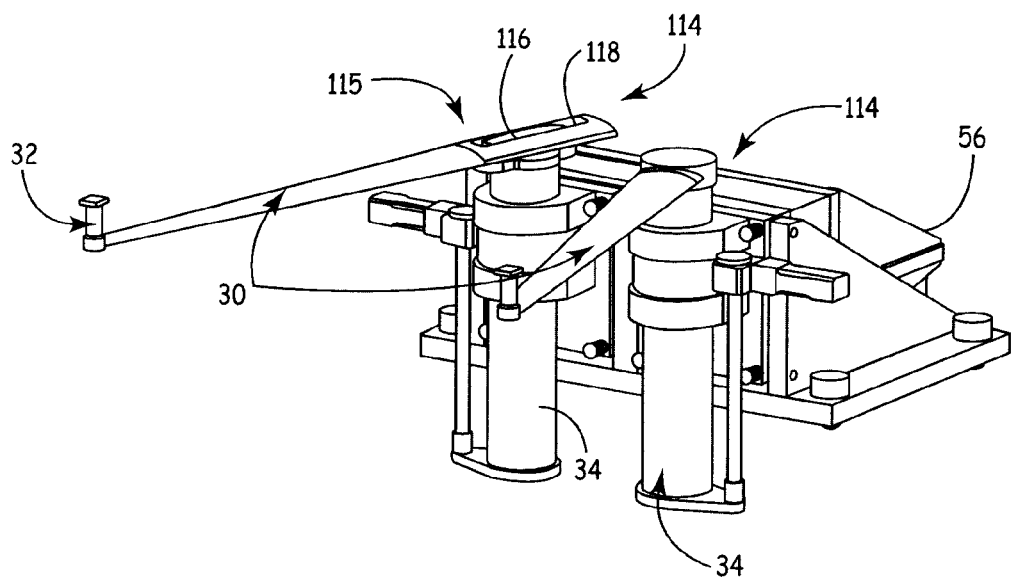
FIG. 18 is a second perspective view of support assembly.

Other forms of supports similar to support 70 discussed above that can be used to form restraint assemblies are illustrated schematically in FIGS. 13 and 14. It should be noted that elements identified with the same numbers perform the same function and have the same characteristics as that discussed above. Referring to FIG. 13, a support 100 includes lower extension 72, upper extension 74 and end assembly 86. However in this embodiment, lift actuator 34 and a positioning actuator 96 are coupled to a support 98, which can be fixed or fixable at a selected location. The positioning actuator 96 displaces a base 102 in a direction indicated by arrow 103, where the base 102 provides support for the pivoting connections 90A and 90B. Like the support 70 discussed above, support 100 can both lift a vehicle as well as apply downwardly directed forces upon the vehicle through coupler 32.

A support 110 illustrated in FIG. 14 is similar to support 100 of FIG. 13; however the lift actuator 34 is coupled to support 110 with a cable or wire 112 rather than a stiff rod. Because of the cable or wire 112, support 110 and lift actuator 34 can be used to lift the vehicle, but downwardly directed forces can not be applied through coupler 32. Struts 40 as discussed above may need to be used to maintain the frame of the vehicle in a rigid state.

FIGS. 15-18 illustrate another restraint 120 that can also restrain the vehicle 13 during testing as well as can lift the vehicle off the belt 22 for servicing. It should be noted that elements identified with the same numbers perform the same function and have the same characteristics as that discussed above. In this embodiment, supports 30 extend from stationary portions of the platform 16 (relative to belt 22) on opposite sides of the vehicle 13 over portions of the belt 22 and are generally aerodynamic (e.g. slender and/or streamlined in shape) to minimize airflow disturbance, although longitudinal positioners can be included. Each support 30 is coupled to a lift actuator 34 comprising a lift column. Lateral positioners 58 mounted to platform 16 each carry pair of lift actuators 34 (comprising lift columns) and support fixture 56 as well as load cell 54 that measures horizontal loads (generally transverse and/or parallel to simulated vehicle motion) and load cells 55 that measures vertical loads (generally orthogonal to simulated vehicle motion).

In this embodiment, each support 30 includes a rotatable head 114 that partially rotates on each associated lift actuator 34. In addition, one or both supports 30 can include a length adjuster 115 that allows the length of the support 30 relative to the platform 16 generally and the lift actuator 34 specifically, to be adjusted. The adjuster 115 can take many forms. Herein, the adjuster 115 includes a member 116 slidable in a guide slot 118. The guide member 116 is mounted to the lift actuator 34, while the guide slot 118 is formed in the support 30; however, if desired, the locations of the guide member and guide slot can be reversed. Locking devices having cooperating engaging members are integrated in the rotatable heads 114 and the adjusters 115 to lock the supports 30 in place.

It should be understood that use of the struts 40 is not limited to the restraint illustrated in FIGS. 4-6, but rather can be used on any type of restraint such as those discussed above as well as all types of restraints even very simple restraints such as cables or poles (illustrated schematically in FIG. 4 at 120. As indicated above, struts 40 can be used to transfer or react vertical forces between the vehicle 13 (or any test article) and the moving belt 22, in a wind tunnel or not. In the embodiment illustrated, a longitudinal axis of each strut 40 is oriented so as to be orthogonal to the surface of the belt 22 and can be of fixed length or can be of adjustable length either manually or remotely. For instance, each of the struts can include components that can be interchanged with components of different length and/or manipulated so as to adjust their length such as interlocking threads. Furthermore, one, but typically, two or more of the struts 40 can include an actuator 126 (FIG. 5) that can be used to adjust the strut remotely. This is particular advantageous for it allows the vehicle height to be adjusted using any of the afore-mentioned restraints. Power to operate the actuator 126 (e.g. fluid power for pneumatic or hydraulic and/or electrical power for electric actuators) can be placed in the vehicle and/or suitable cabling can be provided that can extend from the vehicle to power sources and/or control devices located outside the wind tunnel. Controller 60 schematically illustrates a device for controlling the operation of struts 40 that can be adjusted.

It should also be noted a fluid coupling 42 is not the only type of coupling that can be used to transfer forces to the belt 22. In yet other embodiments, one or more wheels or rollers can also be used.

Although the present invention has been described with reference to preferred embodiments, workers skilled in the art will recognize that changes may be made in form and detail without departing from the spirit and scope of the invention. For instance, although the foregoing embodiments each included two separate supports on each side of the vehicle, this should not be considered limiting. In further embodiments one or more supports can be provided on each side of the vehicle. In addition, each support may connect to one or more points on the vehicle.

What is claimed is:

1. A test system comprising:
a platform having an endless belt movable in a longitudinal direction, the belt having opposed edges movable in the longitudinal direction; and
a restraint configured to restrain a test article in a selected vertical position relative to the moveable belt, the restraint comprising at least a pair of axially rigid supports wherein at least one rigid support is secured to the platform on each longitudinal side of the platform with respect to the movable belt, each rigid support having a first end with a coupler configured to be secured to a longitudinal side of the test article parallel to each corresponding longitudinal edge of the belt, wherein each support extends over at least a portion of the corresponding longitudinal edge of the movable belt, and wherein each support has a second end opposite the first end that is secured to a stationary portion, relative to the movable belt, of the platform on each respective longitudinal side of the movable belt.

2. The test system of claim 1 and further comprising a load cell operably coupled to each support, the load cell configured to measure a vertical force associated with each support.

3. The test system of claim 1 and further comprising an actuator coupled to each support so as to apply a selected force upon the test article.

4. The test system of claim 3 wherein the actuators and supports are configured to lift the test article off the movable belt.

5. The test system of claim 3 wherein each actuator is configured to exert a vertical force on the test article directed toward the movable belt.

6. The test system of claim 1 and further comprising a positioner coupled to at least one support, the positioner configured to adjust a longitudinal position of the support relative to the platform.

7. The test system of claim 1 and further comprising a positioner coupled to at least one support, the positioner configured to adjust a lateral position of the support relative to the platform.

8. The test system of claim 1 wherein the platform is part of a wind tunnel and each of the supports are streamlined.

9. The test system claim 1 wherein the support includes means for adjusting airflow characteristics around the support.

10. The test system of claim 1 wherein each support comprises a stiffening assembly comprising an upright member on the support and elongated members extending from the upright member to each end of the support.

11. The test system of claim 10 wherein each support includes a compartment for storing the upright member and the elongated members.

12. The test system of claim 1 wherein each support comprises a plurality of struts.

13. The test system of claim 1 wherein the test system comprises a wind tunnel configured to blow air over the test article and the movable belt in the longitudinal direction of the belt, wherein each of the supports are streamlined to not disturb air flow adjacent the side of the test article.

14. In combination with a test article, a test system comprising:
a platform having an endless belt movable in a longitudinal direction, the belt having opposed longitudinal edges movable in the longitudinal direction; and
a restraint configured to restrain the test article in a selected position relative to the moveable belt, the restraint comprising at least a pair of axially rigid supports wherein at least one rigid support is secured to the platform on each longitudinal side of the platform with respect to the movable belt, and wherein each axially rigid support has a first end with a coupler secured to a side of the test article adjacent to each corresponding longitudinal edge of the belt, and wherein each support has a second end secured to a stationary portion, relative to the belt, of the platform and extends over at least a portion of the corresponding longitudinal edge of the movable belt, the restraint further comprising an actuator coupled to each support, wherein each actuator is configured to exert a vertical force on a corresponding side of the test article directed toward the movable belt.

15. The combination of claim 14 and further comprising a load cell operably coupled to each support, the load cell configured to measure a vertical force associated with each support.

16. The combination of claim 14 wherein the actuators and supports are configured to lift the test article off the movable belt.

17. The combination of claim 14 wherein the test system comprises a wind tunnel configured to blow air over the test article and the movable belt in the longitudinal direction of the belt, wherein each of the supports are streamlined to not disturb air flow adjacent the side of the test article.

18. The combination of claim 14 wherein the test article comprises a vehicle, and wherein each coupler is coupled to the vehicle between a front wheel and a rear wheel on each corresponding side of the vehicle.

19. The combination of claim 14 and further comprising a strut having a first end coupled to the test article proximate at least one support and a second end configured to engage the belt as it moves so as to transfer force between belt and the test article.

20. The combination of claim 19 wherein the test article comprises a vehicle.

21. The combination of claim 14 wherein the test article comprises a vehicle.

22. The combination of claim 21 and further comprising a plurality of struts, each strut proximate each support and having a first end coupled to the vehicle and a second end configured to engage the belt as the belt moves so as to transfer force between belt and the vehicle.

23. A method for testing a vehicle in a wind tunnel having an movable endless belt movable in a longitudinal direction, the method comprising:

coupling each of opposite longitudinal sides of the vehicle to at least one rigid support provided on each of the opposite longitudinal sides of the vehicle to restrain the vehicle in a selected vertical position relative to the movable belt, each rigid support extending from a first end connected to the vehicle over a side portion of the movable belt transverse to the longitudinal direction to a second end secured a stationary portion in the wind tunnel on each respective longitudinal side of the vehicle; and restraining the vehicle using the rigid supports from each side of the vehicle during application of blowing air upon the vehicle and moving the movable belt.

24. The method of claim 23 and further comprising applying a selected vertical force through each of the supports to the vehicle during application of blowing air upon the vehicle and moving the movable belt.

25. The method of claim 23 and further comprising lifting the vehicle off the movable belt using the supports.

* * * * *